United States Patent
Yoshida (10) Patent No.: US 7,798,654 B2
(45) Date of Patent: Sep. 21, 2010

(54) IMAGE DISPLAY APPARATUS

(75) Inventor: Kazushi Yoshida, Shizuoka (JP)

(73) Assignees: Samsung Electronics Co., Ltd., Suwon (KR); Zero Lab Corporation, Tokyo (JP)

( * ) Notice: Subject to any disclaimer, the term of this patent is extended or adjusted under 35 U.S.C. 154(b) by 241 days.

(21) Appl. No.: 11/658,170

(22) PCT Filed: Jul. 23, 2005

(86) PCT No.: PCT/KR2005/002353

§ 371 (c)(1),
(2), (4) Date: Sep. 30, 2008

(87) PCT Pub. No.: WO2006/009399

PCT Pub. Date: Jan. 26, 2006

(65) Prior Publication Data

US 2009/0040395 A1 Feb. 12, 2009

(30) Foreign Application Priority Data

Jul. 23, 2004 (JP) ............................. 2004-216340
Jul. 4, 2005 (JP) ............................. 2005-195004

(51) Int. Cl.
*G03B 21/14* (2006.01)
(52) U.S. Cl. ........................... 353/98; 353/31; 348/743; 348/771
(58) Field of Classification Search .................. 353/31, 353/94, 98, 99; 348/742, 743, 771
See application file for complete search history.

(56) References Cited

U.S. PATENT DOCUMENTS 6,219,110 B1 4/2001 Ishikawa et al.

(Continued)

FOREIGN PATENT DOCUMENTS

CN 1538235 A 10/2004

(Continued)

OTHER PUBLICATIONS

European Office Action issued Jun. 8, 2010, in counterpart European Application No. 09168115.5.

*Primary Examiner*—William C Dowling
(74) *Attorney, Agent, or Firm*—Sughrue Mion, PLLC (57) ABSTRACT

An image display apparatus is provided with a slim design and improved illumination efficiency and which is able to suppress degradation of contrast thereby eliminating ghosts. The image display apparatus includes: a light source; a condensing mirror which condenses light emitted from the light source and makes a virtual secondary light source; a light tunnel on which light passing through a color filter is incident; a relay lens system through which light exiting the light tunnel passes; a first mirror on which the light passing through the relay lens is directly or indirectly incident; a reflective display including a plurality of micromirrors arranged on a substrate in a matrix, on which the light reflected off the mirror is incident, wherein each micromirror is turned ON or OFF by individually changing the slope of the micromirrors and thus angles of reflection; and a projection lens which enlarges and projects light reflected from the micromirrors in the ON state, wherein the relay lens system and the first mirror are disposed opposite to each other with an optical axis of the projection lens interposed therebetween.

12 Claims, 8 Drawing Sheets

U.S. PATENT DOCUMENTS

| | | | |
|---|---|---|---|
| 6,471,356 B1 | 10/2002 | Gohman et al. | |
| 6,601,959 B2 | 8/2003 | Miyata et al. | |
| 6,652,105 B1 | 11/2003 | Peterson et al. | |
| 6,799,852 B2* | 10/2004 | Sekiguchi et al. | 353/102 |
| 6,834,967 B2* | 12/2004 | Liao et al. | 353/98 |
| 7,019,376 B2* | 3/2006 | Patel et al. | 257/436 |
| 7,033,031 B2* | 4/2006 | Hori | 353/99 |
| 7,066,607 B2* | 6/2006 | Kwon | 353/98 |
| 7,159,991 B2* | 1/2007 | Ito | 353/98 |
| 7,258,451 B2* | 8/2007 | Wang | 353/99 |
| 7,382,538 B2* | 6/2008 | Fukunaga | 359/649 |
| 2002/0008856 A1 | 1/2002 | Okamori et al. | |
| 2002/0118310 A1 | 8/2002 | DeLong | |
| 2002/0141070 A1 | 10/2002 | Sawai | |
| 2003/0147052 A1 | 8/2003 | Penn et al. | |
| 2004/0135975 A1* | 7/2004 | Wang | 353/84 |
| 2004/0169829 A1 | 9/2004 | Kwon | |
| 2004/0201828 A1* | 10/2004 | Wang | 353/84 |
| 2004/0207816 A1 | 10/2004 | Omoda et al. | |
| 2005/0270501 A1* | 12/2005 | Yoshida | 353/99 |
| 2006/0126031 A1* | 6/2006 | Kim et al. | 353/98 |
| 2007/0153240 A1* | 7/2007 | Liu et al. | 353/98 |
| 2007/0216873 A1* | 9/2007 | Doi | 353/53 |
| 2008/0036973 A1* | 2/2008 | Kojima et al. | 353/38 |
| 2008/0079911 A1* | 4/2008 | Liu et al. | 353/84 |

FOREIGN PATENT DOCUMENTS

| | | |
|---|---|---|
| EP | 1447703 A1 | 8/2004 |
| JP | 2003/307708 A | 10/2003 |
| JP | 2004-045718 A | 2/2004 |
| WO | 01/55771 A2 | 8/2001 |
| WO | 03/032048 A1 | 4/2003 |
| WO | 2004/042450 A1 | 5/2004 |

\* cited by examiner

IMAGE DISPLAY APPARATUS

CROSS-REFERENCE TO RELATED PATENT APPLICATIONS

This application claims priority from Japanese Patent Application Nos. 10-2004-0216340 and 10-2005-0195004, filed on Jul. 23, 2004, and Jul. 4, 2005, respectively, in the Japanese Intellectual Property Office, the disclosures of which are incorporated herein in their entirety by reference.

BACKGROUND OF THE INVENTION

1. Field of the Invention

The present invention relates to an image display apparatus with a plurality of micromirrors that are arranged in a matrix and can change angles of reflection.

2. Description of the Related Art

An example of an image display apparatus employing micromirrors that can turn on or off (reflect or not reflect light into a projection lens) by individually changing the slope of each micromirror, i.e., angles of reflection is conventionally disclosed in Japanese Laid-open Patent Application No. 1996-0014691.

Figure 8:
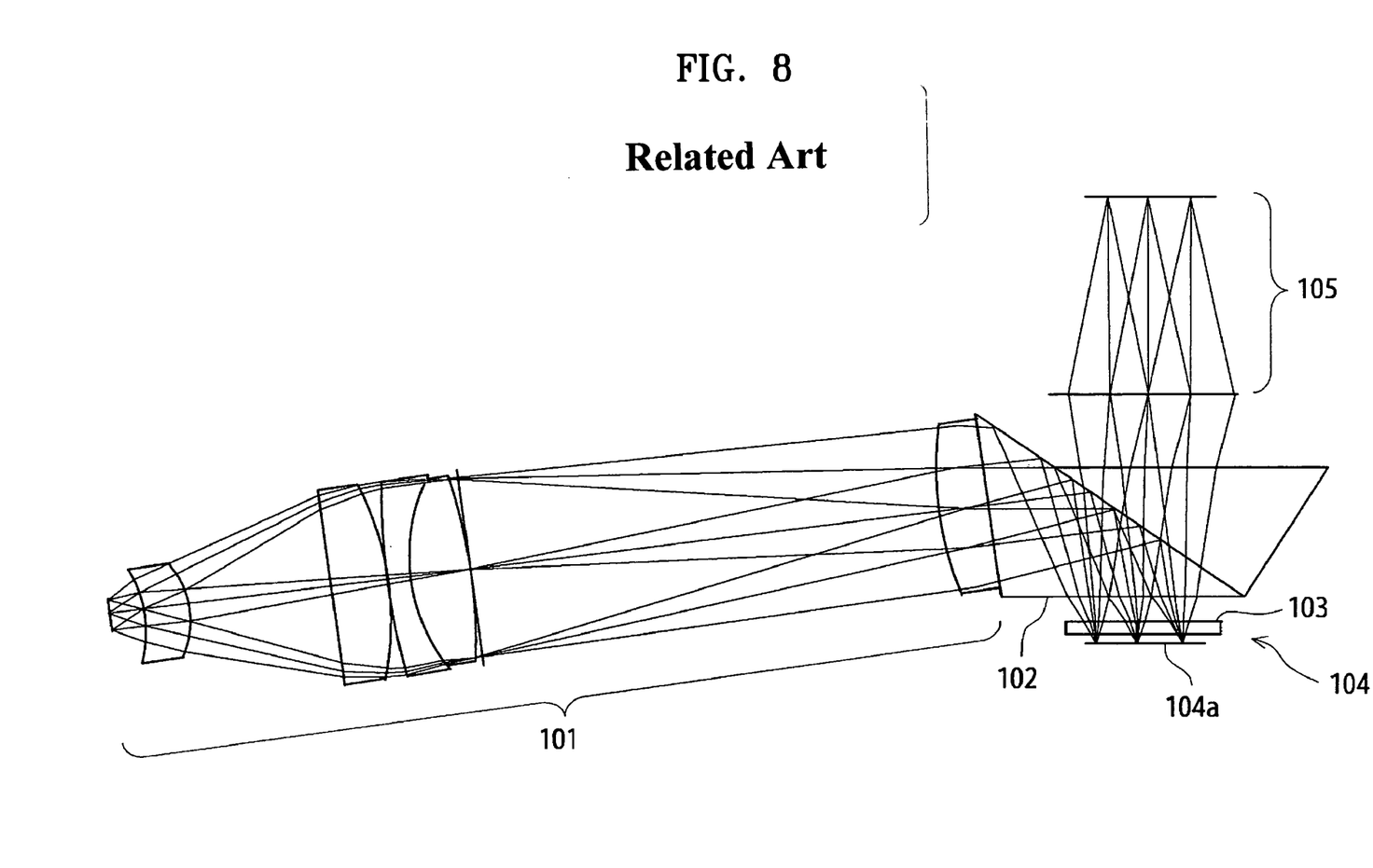
FIG. 8 is a schematic diagram of a related art image display apparatus.

In the image display apparatus configured as shown in FIG. 8, light emitted from a light source (not shown) is reflected from a condensing mirror (not shown), is separated into color components by a color filter (not shown), and incident on a light tunnel (not shown). The light exiting the light tunnel passes through a relay lens system 101 and is then incident on a total reflection prism 102. The light reflected from the total reflection prism 102 passes through cover glass 103 and is incident on a reflective display 104. The reflective display includes a plurality of micromirrors 104a arranged in a matrix. Each of the micromirrors 104a changes the slope, and thus an angle of reflection of each of the micromirrors is independently changed. The micromirror 104a is turned on, when light is reflected toward a projection lens 105. The micromirror 104a is turned off, when the light is reflected in a different direction than toward the projection lens 105. By controlling the on/off state of the micromirror 104a, a desired image can be projected by the projection lens 105 for display.

However, the image display apparatus using the total reflection prism 102 becomes bulky and expensive due to the increased number of lenses in the relay lens system 101 and the high price of the total reflection prism. The image display apparatus also suffers degradation in illumination efficiency as light passes through optical surfaces of the relay lens system 101 with a large number of lenses and the total reflection prism 102 in an optical path.

SUMMARY OF THE INVENTION

Exemplary embodiments of the present invention provide an image display apparatus with a slim design and improved illumination efficiency and which is able to suppress degradation of contrast thereby eliminating ghosts.

According to an aspect of the present invention, there is provided an image display apparatus including: a light source; a condensing mirror which condenses light emitted from the light source and makes a virtual secondary light source; a light tunnel on which light passing through a color filter is incident; a relay lens system through which light exiting the light tunnel passes; a first mirror on which the light passing through the relay lens system is directly or indirectly incident; a reflective display including a plurality of micromirrors arranged on a substrate in a matrix, on which light reflected off the first mirror is incident, wherein each micromirror is turned to an ON state or an OFF state by individually changing the slope of the micromirrors and thus angles of reflection; and a projection lens which enlarges and projects light reflected from the micromirrors in the ON state, wherein the relay lens and the first mirror are disposed opposite to each other with an optical axis of the projection lens interposed therebetween.

The first mirror may have an effective diameter that is partially cut so as not to block light reflected from the plurality of micromirrors.

A principal ray of light reflected from a micromirror in the ON state located at the center of the reflective display may be inclined at an angle to the optical axis of the projection lens in a direction away from the first mirror.

With a rotary axis pointing in the direction of a short side of the substrate, the micromirror may be turned to the "ON" state or "OFF" state by changing the slope in a direction of a long side and thus the angle of reflection. On the other hand, with a rotary axis pointing in a direction of a long side of the substrate, the micromirror may be turned ON or OFF by changing the slope in a direction of a short side and thus the angle of reflection.

When the micromirror is square-shaped with a rotary axis of a direction of one diagonal, the micromirror may be turned to the ON state or OFF state by changing the slope in a direction of the other diagonal and thus the angle of reflection.

The mirror may have a planar, spherical, or rotationally asymmetric curved reflective surface.

The light tunnel may have an exit end tilted at an angle relative to a line perpendicular to its central axis.

An optical axis of the relay lens may deviate from the central axis of the light tunnel. Alternatively, a front group within the relay lens system may deviate from a rear group.

The image display apparatus may further include a second mirror on which the light exiting the relay lens system is incident. Light may be reflected from the second mirror to the first mirror.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF EXEMPLARY EMBODIMENTS OF THE INVENTION

Figure 1A:
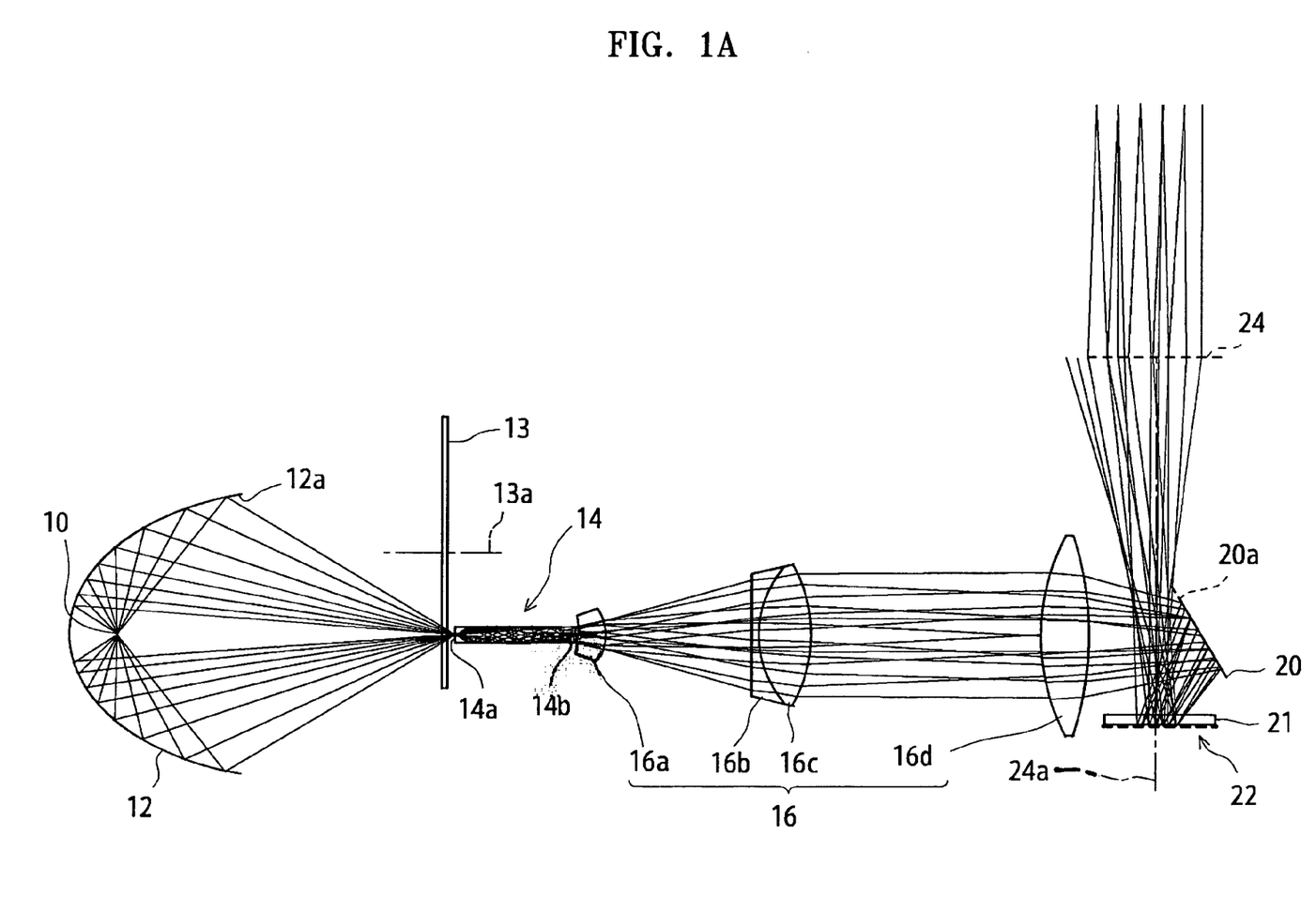
FIG. 1A is a schematic diagram of an image display apparatus according to an exemplary embodiment of the present invention and FIG. 1B is a schematic diagram showing components from an exit end of a light tunnel to a mirror with an optical axis of a projection lens positioned therebetween.

The present invention will now be described more fully with reference to the accompanying drawings, in which exemplary embodiments of the invention are shown. Referring to FIG. 1A, an image display apparatus according to an exemplary embodiment of the present invention includes a light source 10, a condensing mirror 12, a light tunnel 14, a relay lens system 16, a mirror 20, a reflective display 22, and a projection lens 24.

The light source 10 is a white light source such as a halogen lamp, a xenon lamp, a metal halide lamp, or a high-pressure mercury lamp. The condensing mirror 12 is disposed to surround the light source 10 and has a beam exit 12a opening toward the light tunnel 14. The condensing mirror 12 reflects and condenses light emitted radially from the light source 10 and exits the light into the light tunnel 14 through the beam exit 12a.

Figure 2:
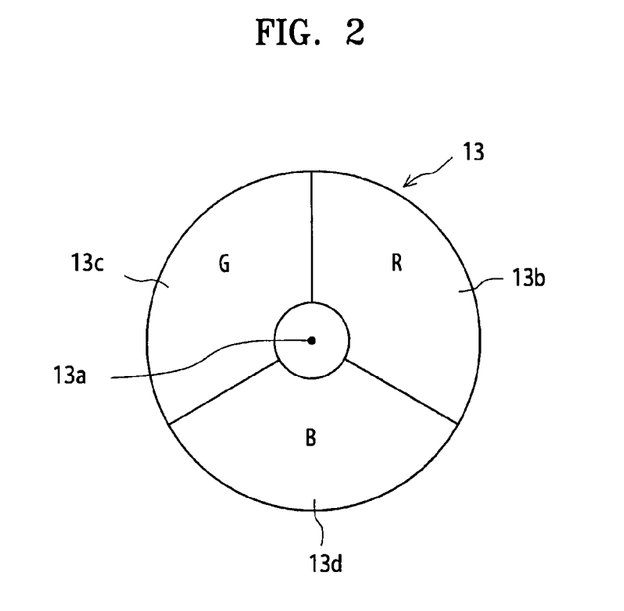
FIG. 2 is a plan view of a color filter according to an exemplary embodiment of the present invention.

A widely known color filter 13 is disposed directly in front of an end portion 14a of a light tunnel and sequentially separates and exits incident light into three primary red, green and blue (RGB) colors. For example, referring to FIG. 2, the color filter 13 may include three RGB color filters 13b through 13d arranged on a disc-shaped substrate at equal angular intervals about a rotary axis 13a. When light is illuminated from the condensing mirror 12 to a predetermined location of the color filter 13 rotating at constant rate, R, G, and B color beams are filtered to the light tunnel 14 through the color filter 13 at time intervals (sequentially) corresponding to the angular intervals at which the RGB filters are arranged.

Figure 3:
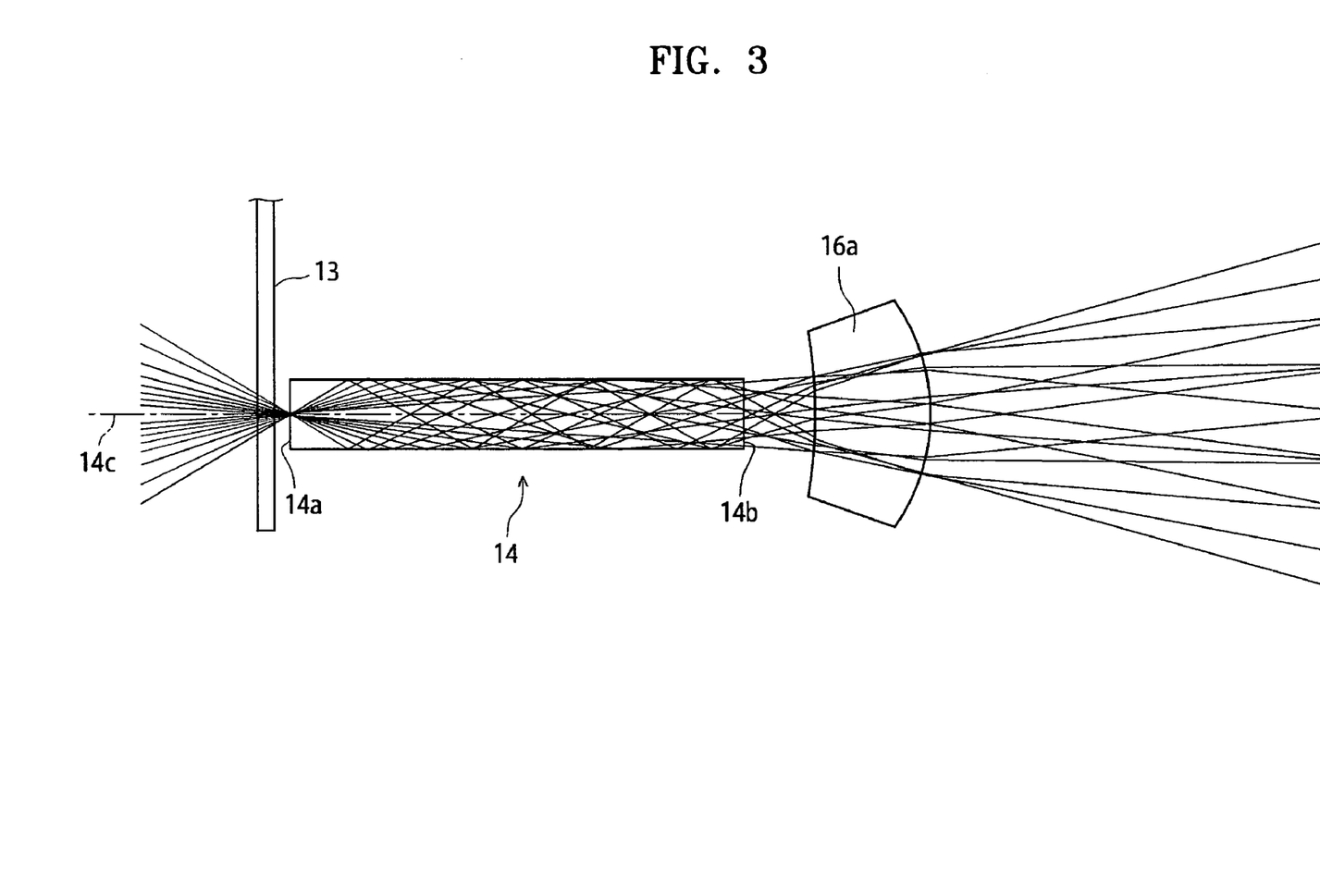
FIG. 3 is a schematic diagram showing arrangement of a light tunnel and a lens of a relay lens system on which light exiting the light tunnel is incident and propagation of light through the light tunnel and the lens.

The light tunnel 14 totally internally reflects light incident from one rectangular end portion (incident end) 14a in order to allow light with a uniform intensity to exit through the other end portion (exit end) 14b (see FIG. 3). Here, the two end portions 14a and 14b are perpendicular to a central axis 14c of the light tunnel 14 and light exits through the end portion 14b symmetrically about the central axis 14c. The light exiting the light tunnel 14 in this way is magnified at a predetermined magnification ratio by the relay lens system 16 with four lenses 16a through 16d and proceeds toward the mirror 20. That is, the light exiting from the relay lens system 16 is directly incident upon the mirror 20.

Figure 1B:
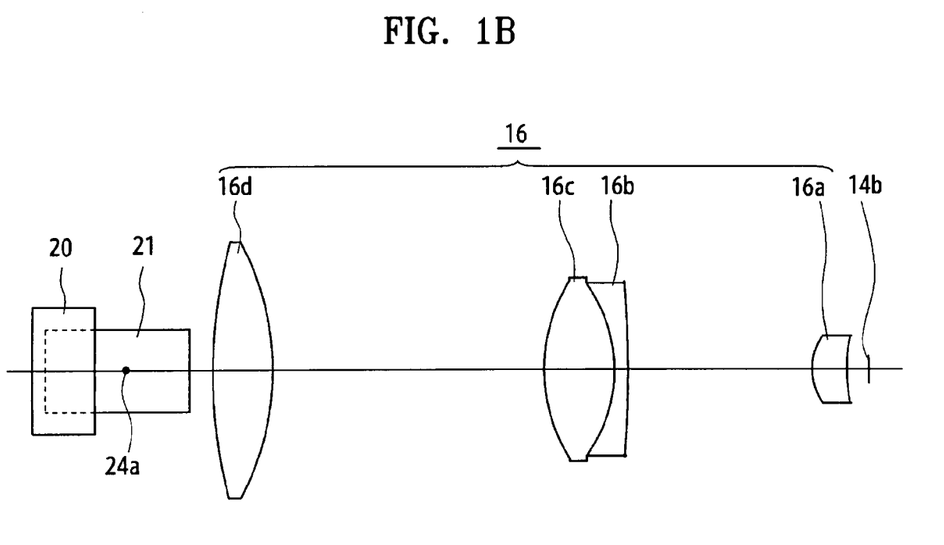

The mirror (first mirror) 20 has a planar surface and reflects light passing through the relay lens system 16 to the reflective display 22. The reflected light is focused onto a micromirror corresponding to a reflective position in a reflective surface of the reflective display 22. The mirror 20 has an effective diameter that is partially cut as indicated by a dotted line in FIG. 1A to prevent some of light reflected by the micromirrors in the reflective display 22 from being blocked by the mirror 20 so that it cannot reach the projection lens 24. Thus, it is possible to achieve a uniform intensity distribution of light being projected onto a screen (not shown) through the projection lens 24. Here, the relay lens 16d is disposed opposite the mirror 20 with respect to an optical axis 24a of the projection lens 24 interposed therebetween (See FIGS. 1A and 1B) to make the intensity distribution of light projected onto the screen uniform while reducing the amount of light that passes through the relay lens system 16 but is not projected onto the screen. This also reduces the entire length of an illumination optical system in which an image from the end portion 14b is focused on the reflective display 22 after passing through the relay lens system 16 and the mirror 20, thereby reducing the overall size of the image display apparatus.

The reflective display 22 is a semiconductor device including a plurality of micromirrors arranged on a substrate in a matrix form. The micromirrors individually change the slope thus angle of reflection to an ON or OFF state. In the ON state, light is reflected toward the projection lens 24. In the OFF state, the light is reflected in a different direction than toward the projection lens 24.

With a rotary axis of the direction of a short or long side of a rectangular substrate, a micromirror may oscillate in the direction of the long or short side thereof, thereby changing the angle of reflection. Alternatively, when a micromirror is square-shaped with a rotary axis of the direction of one diagonal, the micromirror may oscillate in the direction of the other diagonal. The present exemplary embodiment uses the reflective display with a rotary axis of the direction of a short side.

When the reflective display is Texas Instrument's Digital Micromirror Device (DMD), because the micromirror can oscillate between −12° and +12° about its equilibrium position, the angle of reflection may be selected from the micromirror of either −12° or +12°. When light is reflected and condensed onto the reflective display 22 having the above-described configuration through cover glass 21, light reflected from a micromirror in the ON state (rotating to +12°) is enlarged by the projection lens 24 and projected on the screen, while light reflected from a micromirror in an OFF state (rotating to −12°) is not projected on the screen. By controlling the ON/OFF state of micromirrors arranged in a matrix, a desired image can be displayed on the screen.

Figure 4A:
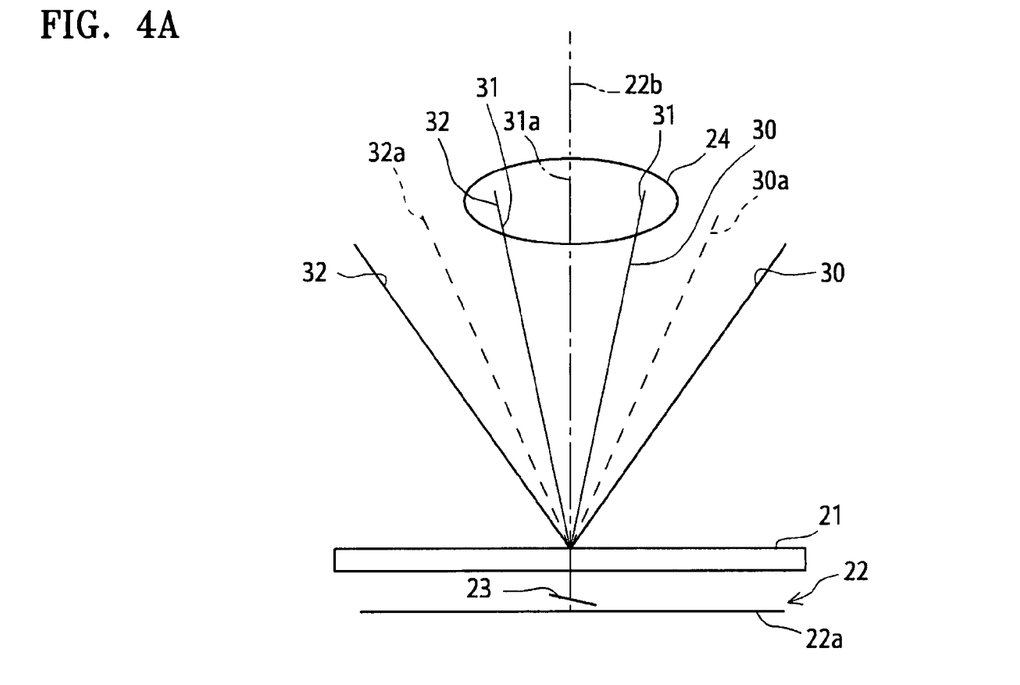
FIGS. 4A and 4B are schematic diagrams showing changes in the propagation direction of light reflected by reflective display and cover glass with respect to an angle at which light is incident on the reflective display according to an exemplary embodiment of the present invention.

Light reflected off the mirror 20 is reflected by the front or rear surface of the cover glass 21 or a substrate surface of the reflective display 22 as well as by the micromirror. Also, scattered light may occur due to the structure of a micromirror. When the reflected light and scattered light are incident on the projection lens 24, the contrast of light projected onto the screen may be degraded. FIG. 4A is a schematic diagram for explaining this state. Referring to FIG. 4A, when illuminating light 30 (principal ray 30a) is incident on a micromirror 23 located at the center of a reflective display 22 through cover glass 21, light 31 reflected from the micromirror 23 in the ON state propagates such that a principal ray 31a of the light 31 is normal to a substrate 22a of the reflective display 22 and is incident on the projection lens 24. On the other hand, a fraction of light 32 (principal ray 32a) reflected from the front or rear surface of the cover glass 21 or substrate surface of the reflective display 22 is incident on the projection lens 24.

Figure 4B:
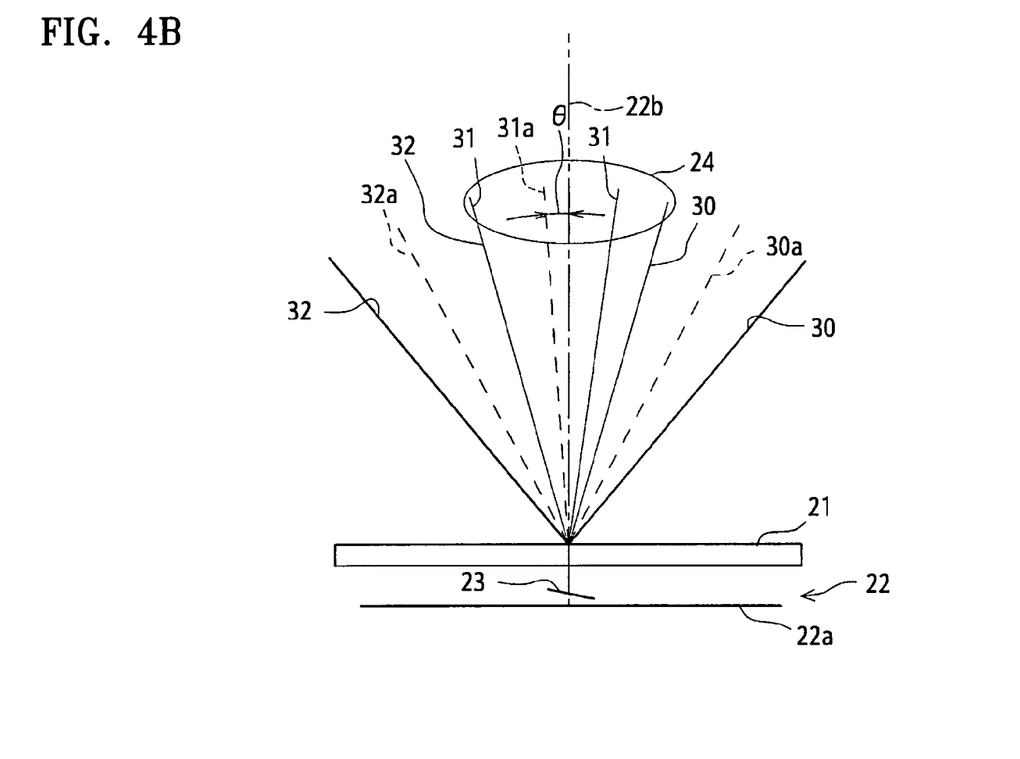

In the present exemplary embodiment, to suppress degradation of contrast due to the light 32 reflected from the front or rear surface of the cover glass 21 or substrate surface of the reflective display 22, as shown in FIG. 4B, the principal ray 31a of the reflected light 31 from the micromirror 23 in the ON state is inclined at an angle of θ to the normal 22b of the substrate 22a in a direction away from the mirror 20. This inclination is realized by illuminating the illuminating light 30 (including a principal ray 30a) an angle of θ away from the normal 22b to the substrate 22a more than the state shown in FIG. 4A. Since a principal ray 32a of the light 32 reflected from the front or rear surface of the cover glass 21 or substrate surface of the reflective display 22 is far away from the normal 22b, it is possible to reduce the amount of the light 32 incident on the projection lens 24. In FIG. 4B, the ray is indicated briefly for convenience of explanation.

Light reflected by the reflective display 22 is incident on a projection lens and magnified at a predetermined magnification ratio and projected onto a screen. Light reflected from each micromirror corresponds to a pixel on the screen and three primary colors are sequentially projected for each pixel. By controlling the ON/OFF state of each micromirror, it is possible to display a desired color on the screen.

Modified examples will now be described.

Figure 5:
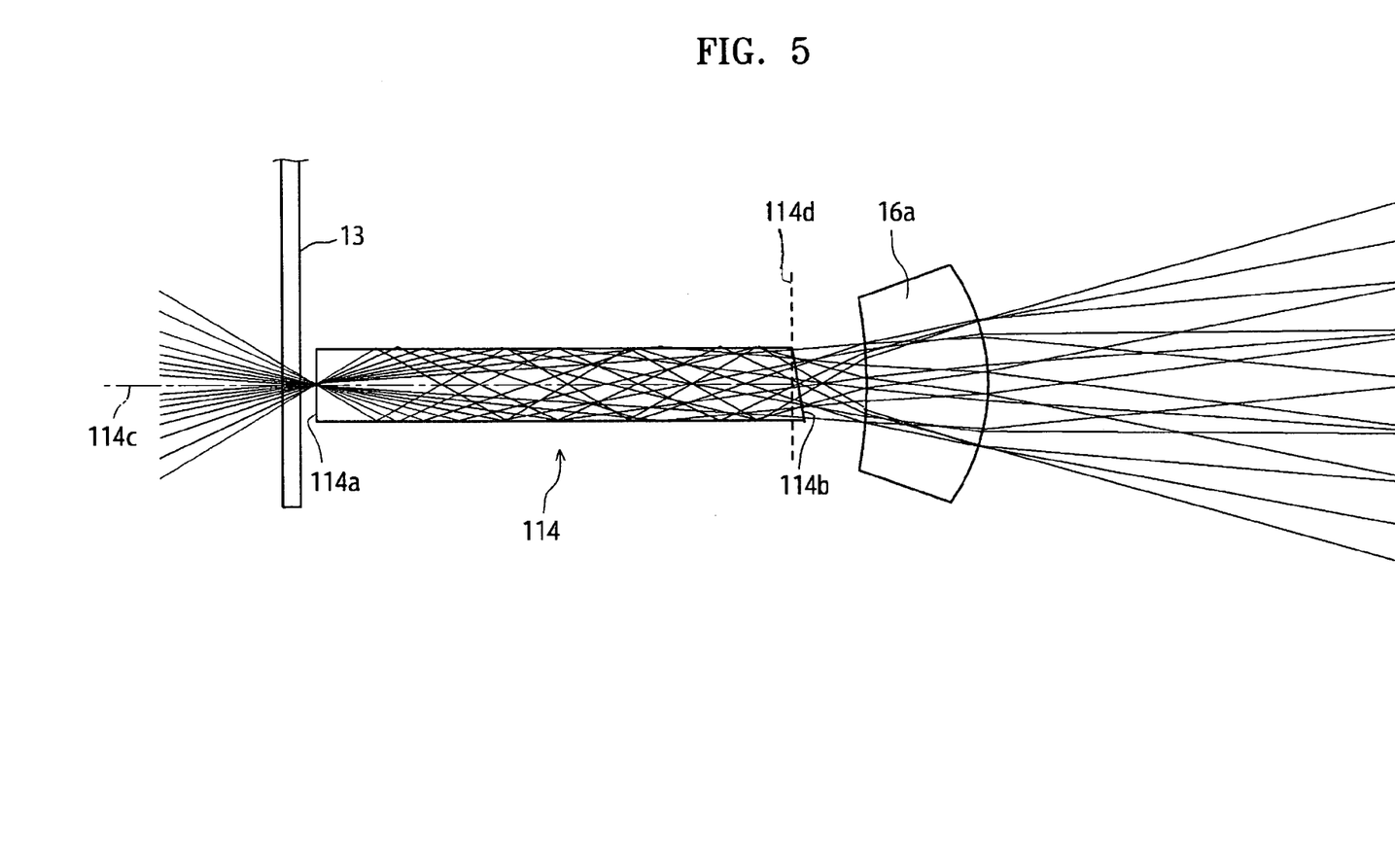
FIG. 5 is a first modified example of the exemplary embodiment showing arrangement of a light tunnel and a lens of a relay lens system on which light exiting the light tunnel is incident and propagation of light through the light tunnel and the lens.

While it is described above that the two end portions 14a and 14b are perpendicular to the central axis 14c, a light tunnel 114 shown in FIG. 5 (first modified example) may be used instead of the light tunnel 14. In the light tunnel 114, an exit end 114b is tilted at an angle of α to a line 114d perpendicular to a central axis 114c. When the end portion 14 is perpendicular to the central axis 14c of the light tunnel 14 as shown in FIG. 1A and FIG. 3, the image from the end portion 14b is focused obliquely on the reflective display 22 and thus illuminating light is out of focus at both the left and right sides of the reflective display 22. This will reduce the amount of light reflected from the effective reflective surface of the reflective display 22 as well as the amount of light projected on the screen through the projection lens 24. To overcome these limitations, in the first modified example, the end portion 114b (exit end) is tilted toward the line perpendicular to the central axis 114c such that an image from the end portion 114a is focused without tilting onto the reflective display 22 according to the Shine Proof Law, thereby preventing a reduction in the amount of light being projected on the screen while achieving a more efficient optical system. The end portion 114a (incident end) is perpendicular to the central axis 114c like the end portion 14a of the light tunnel 14 shown in FIG. 1A and FIG. 3. The angle α can be either positive or negative.

The mirror 20 may have a spherical or rotationally asymmetric curved reflective surface, thereby reducing the overall size of an optical system.

Figure 6:
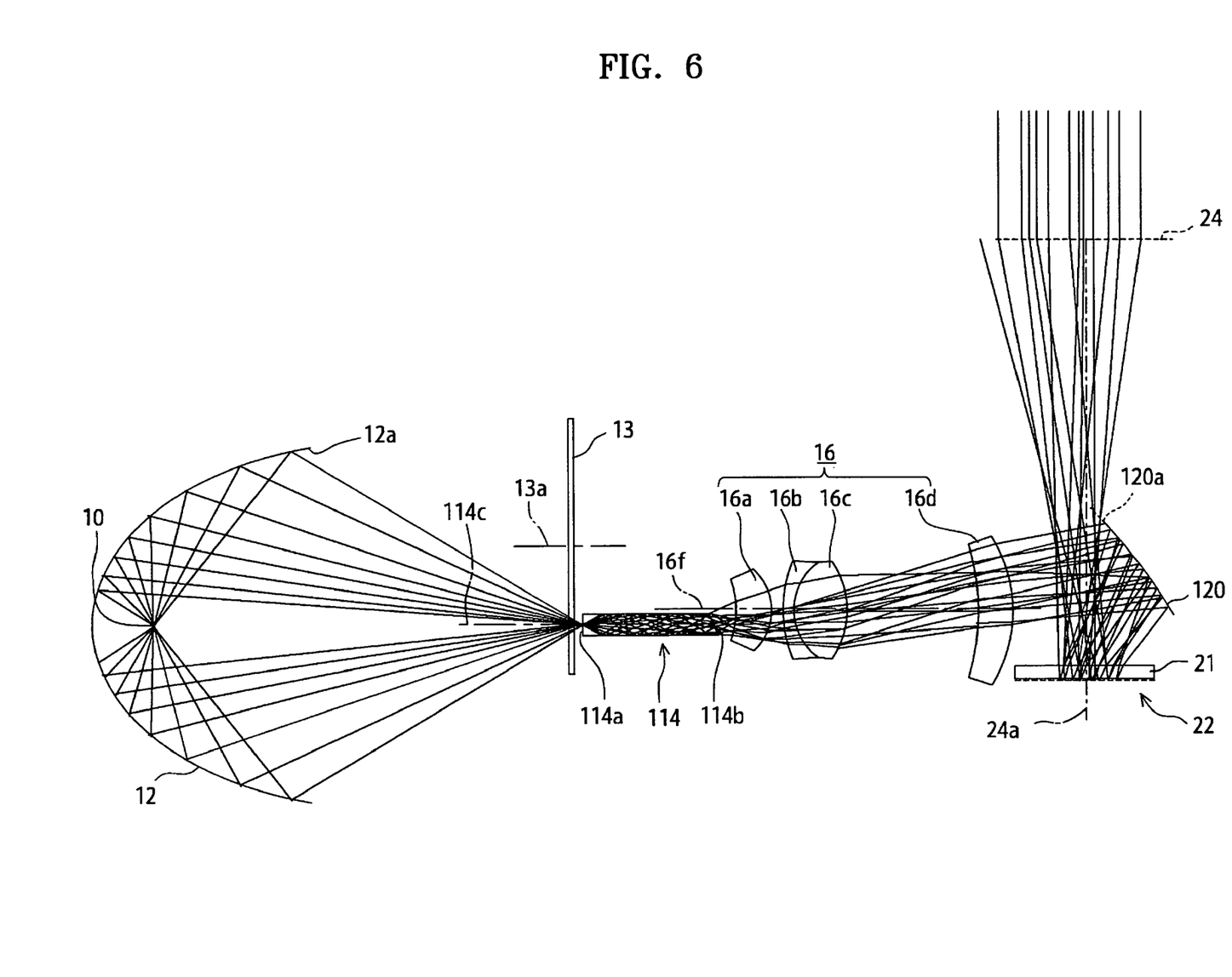
FIG. 6 shows an image display apparatus according to a second modified example of the exemplary embodiment of the present invention.

FIG. 6 shows an image display apparatus according to a second modified example of the exemplary embodiment of the present invention. Referring to FIG. 6, a light tunnel 114 has the same configuration as its counterpart shown in FIG. 5. A central axis 114c of the light tunnel 114 deviates from an optical axis 16f of a relay lens system 16. Furthermore, a mirror 120 has a spherical reflective surface. When the exit end 114b is tilted at an angle relative to the line perpendicular to the central axis 114c so that the image from the end portion 114a is focused without tilting onto the reflective display 22 as shown in the first modified example of FIG. 5, trapezoidal deformation of the image causes a difference between the amount of illuminating light at both the left and right sides of the reflective display 22, thus resulting in uneven distribution of light being projected by the projection lens 24 across the screen from left to right or right to left. To correct the trapezoidal deformation and improve uniformity in the amount of light on the reflective display 22, in the second modified example, the central axis 114c of the light tunnel 114 deviates from the optical axis 16f of the relay lens system 16. Alternatively, an optical axis of a front group or a rear group within the relay lens system 16 deviates from the central axis of the light tunnel.

Further, the mirror 120 having a spherical reflective surface will shorten the entire length of the optical system, thereby reducing the overall size of the image display apparatus. Like in the mirror 20 shown in FIG. 1, a portion of an effective diameter 120a (indicated by a dotted line in FIG. 6) is cut to prevent some of light reflected by the micromirrors in the reflective display 22 from being blocked by the mirror 120 so that it cannot reach the projection lens 24, thereby providing a uniform intensity distribution of light being projected onto a screen (not shown) through the projection lens 24.

When a fly-eye lens or rod lens is used instead of the light tunnel 114, the intensity of light reflected from a condensing mirror 12 can be made uniform through the fly-eye lens or the rod lens and then the resultant light is incident on the relay lens system 16.

Figure 7:
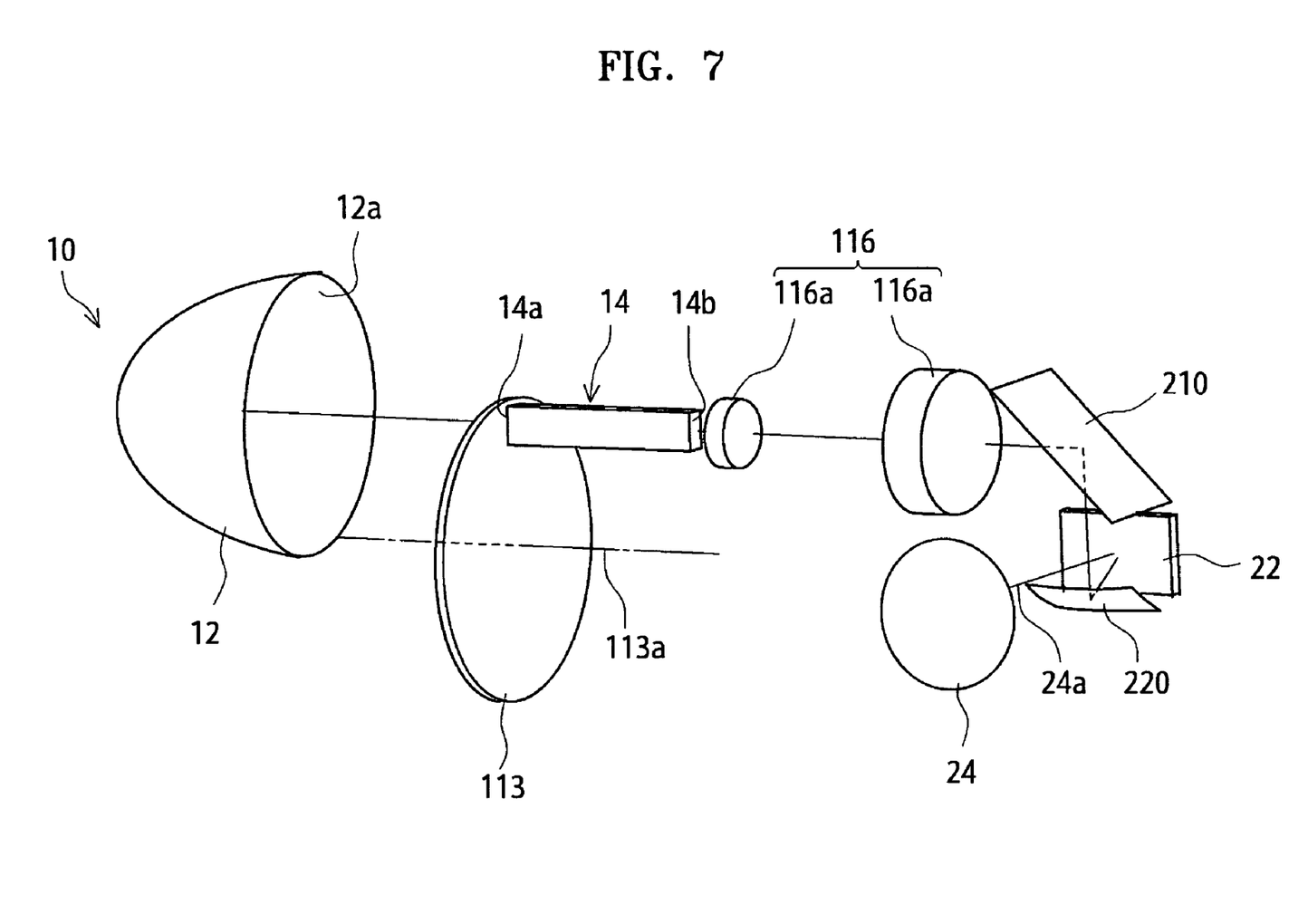
FIG. 7 is a schematic diagram of an image display apparatus according to a third modified example of the exemplary embodiment of the present invention.

FIG. 7 is a schematic diagram of an image display apparatus according to a third modified example of the exemplary embodiment of the present invention. FIG. 7 does not show light rays. Like the color filter 13, a color filter 113 includes three RGB color filters arranged on a disc-shaped substrate at equal angular intervals about a rotary axis 113a. When light is reflected off the condensing mirror 12 to a predetermined location of the color filter 113 rotating at constant rate, R, G, and B color beams are filtered to the light tunnel 14 through the color filter 113 at time intervals (sequentially) corresponding to the angular intervals at which the RGB filters are arranged.

In the third modified example, a relay lens system 116 includes two lenses 116a and 116b. Light passing through the relay lens system 116 is incident on a second mirror 210. The second mirror 210 reflects the light onto a mirror (first mirror) 220 and then is incident on a reflective display 22. That is, the light exiting the relay lens system 116 is incident indirectly on the first mirror 220 through the second mirror 210. Light reflected off a micromirror in the ON state is projected toward the projection lens 24, while light reflected from a micromirror in the OFF state is projected in a different direction than toward the projection lens 24. Here, the relay lens system 116 is disposed opposite the first mirror 220 with respect to an optical axis 24a of the projection lens 24 interposed therebetween. This arrangement is the same as in the embodiment and the first and second modified examples, assuming that a portion including components from a light source 10 to the relay lens system 116 bent by the second mirror 210 unfolds in a direction of the optical axis 24a between the second mirror 210 and the mirror 220. The second and first mirrors 210 and 220 are disposed such that the longitudinal direction (horizontal direction in FIG. 7) of a substrate of a reflective display 22 is parallel to the direction of the optical axis passing through the centers of components from the light source 10 to the relay lens system 116, thereby minimizing the size of the image display apparatus in the direction of the optical axis 24a between the second and first mirrors 210 and 220.

The image display apparatus of the present invention has a reduced number of lenses in a relay lens system by focusing light onto a reflective display, thereby reducing the overall size while increasing the illumination efficiency by reducing the number of optical surfaces. The image display apparatus also eliminates the need for a total reflection prism, thereby reducing the manufacturing costs.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. An image display apparatus comprising:
   a light source;
   a condensing mirror which condenses light emitted from the light source and makes a virtual secondary light source;
   a light tunnel on which light passing through a color filter is incident;

a relay lens system through which light exiting the light tunnel passes;

a first mirror on which the light passing through the relay lens is directly or indirectly incident;

a reflective display including a plurality of micromirrors arranged on a substrate in a matrix, on which light reflected off the first mirror is incident, wherein each micromirror is turned to an ON state or an OFF state by individually changing the slope of the micromirrors and thus angles of reflection; and a projection lens which enlarges and projects light reflected from the micromirrors in the ON state, wherein the relay lens and the first mirror are disposed opposite to each other with respect to an optical axis of the projection lens interposed therebetween, and wherein the light tunnel has an exit end tilted at an angle relative to a line perpendicular to its central axis.

2. The apparatus of claim 1, wherein the first mirror has an effective diameter that is partially cut so as not to block light reflected from the plurality of micromirrors.

3. The apparatus of claim 1, wherein a principal ray of light reflected from a micromirror in the ON state located at the center of the reflective display is inclined at an angle to the optical axis of the projection lens in a direction away from the first mirror.

4. The apparatus of claim 1, wherein with a rotary axis of a direction of a short side of the substrate, the micromirror is turned ON or OFF by changing the slope in a direction of a long side and thus the angle of reflection.

5. The apparatus of claim 1, wherein with a rotary axis of a direction of a long side of the substrate, the micromirror is turned ON or OFF by changing the slope in a direction of a short side and thus the angle of reflection.

6. The apparatus of claim 1, wherein when being square-shaped with a rotary axis of a direction of one diagonal, a corresponding one of the micromirrors is turned ON or OFF by changing the slope in a direction of the other diagonal and thus the angle of reflection.

7. The apparatus of claim 1, wherein the first mirror has a planar reflective surface.

8. The apparatus of claim 1, wherein the first mirror has a spherical reflective surface.

9. The apparatus of claim 1, wherein the first mirror has a rotationally asymmetric curved reflective surface.

10. The apparatus of claim 1, further comprising a second mirror on which the light exiting the relay lens system is incident, wherein light is reflected from the second mirror to the first mirror.

11. An image display apparatus comprising:

a light source;

a condensing mirror which condenses light emitted from the light source and makes a virtual secondary light source;

a light tunnel on which light passing through a color filter is incident;

a relay lens system through which light exiting the light tunnel passes;

a first mirror on which the light passing through the relay lens is directly or indirectly incident;

a reflective display including a plurality of micromirrors arranged on a substrate in a matrix, on which light reflected off the first mirror is incident, wherein each micromirror is turned to an ON state or an OFF state by individually changing the slope of the micromirrors and thus angles of reflection; and a projection lens which enlarges and projects light reflected from the micromirrors in the ON state, wherein the relay lens and the first mirror are disposed opposite to each other with respect to an optical axis of the projection lens interposed therebetween, and wherein an optical axis of the relay lens system deviates from the central axis of the light tunnel.

12. An image display apparatus comprising:

a light source;

a condensing mirror which condenses light emitted from the light source and makes a virtual secondary light source;

a light tunnel on which light passing through a color filter is incident;

a relay lens system through which light exiting the light tunnel passes;

a first mirror on which the light passing through the relay lens is directly or indirectly incident;

a reflective display including a plurality of micromirrors arranged on a substrate in a matrix, on which light reflected off the first mirror is incident, wherein each micromirror is turned to an ON state or an OFF state by individually changing the slope of the micromirrors and thus angles of reflection; and a projection lens which enlarges and projects light reflected from the micromirrors in the ON state, wherein the relay lens and the first mirror are disposed opposite to each other with respect to an optical axis of the projection lens interposed therebetween, and wherein an optical axis of one of a front group and a rear group within the relay lens system deviates from the central axis of the light tunnel.

* * * * *